Feb. 16, 1954
W. A. KIVELL ET AL
2,669,357
CLARIFICATION TREATMENT OF SOLIDS CARRYING
LIQUID AND APPARATUS THEREFOR
Filed March 19, 1952
5 Sheets-Sheet 1
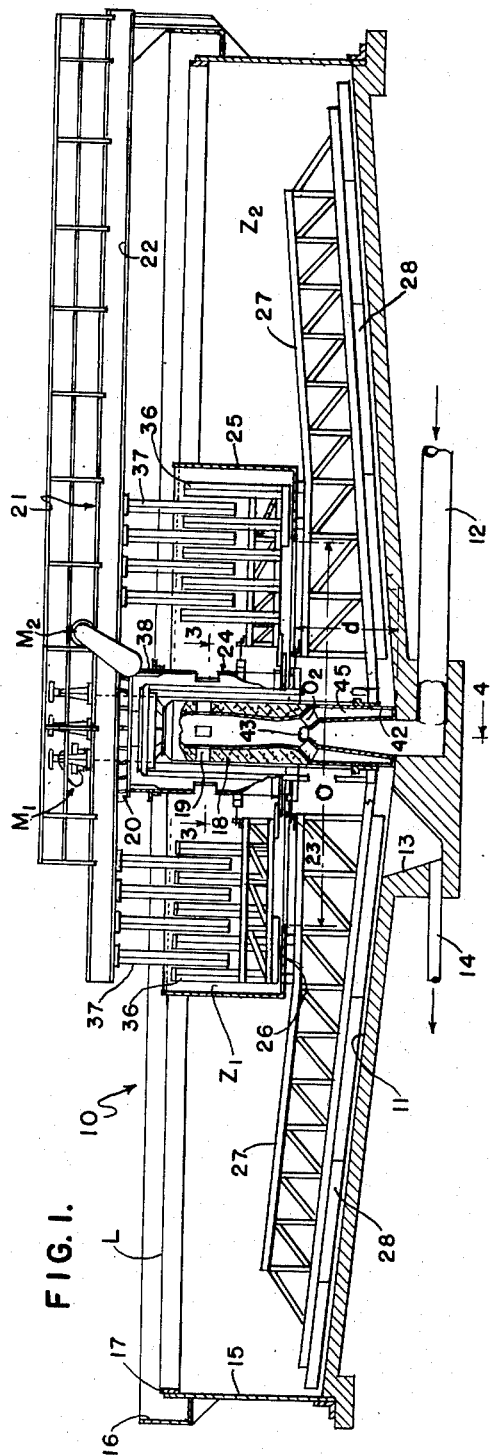
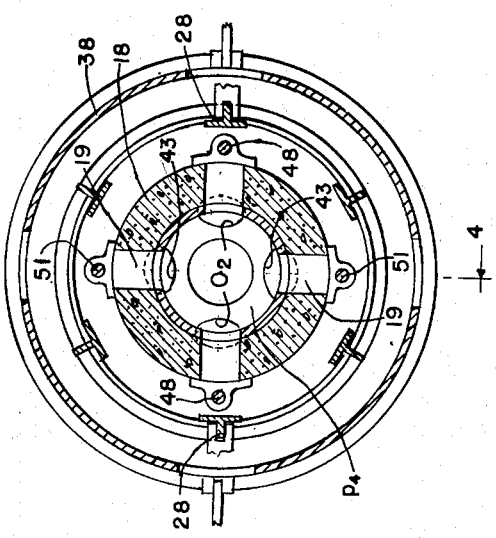
INVENTORS:
WAYNE A. KIVELL &
RENVILLE S. RANKIN,
BY William Fox
ATTORNEY Feb. 16, 1954 — W. A. KIVELL ET AL — 2,669,357
CLARIFICATION TREATMENT OF SOLIDS CARRYING LIQUID AND APPARATUS THEREFOR
Filed March 19, 1952 — 5 Sheets-Sheet 2

INVENTORS:
WAYNE A. KIVELL &
RENVILLE S. RANKIN,
BY William Fox
ATTORNEY

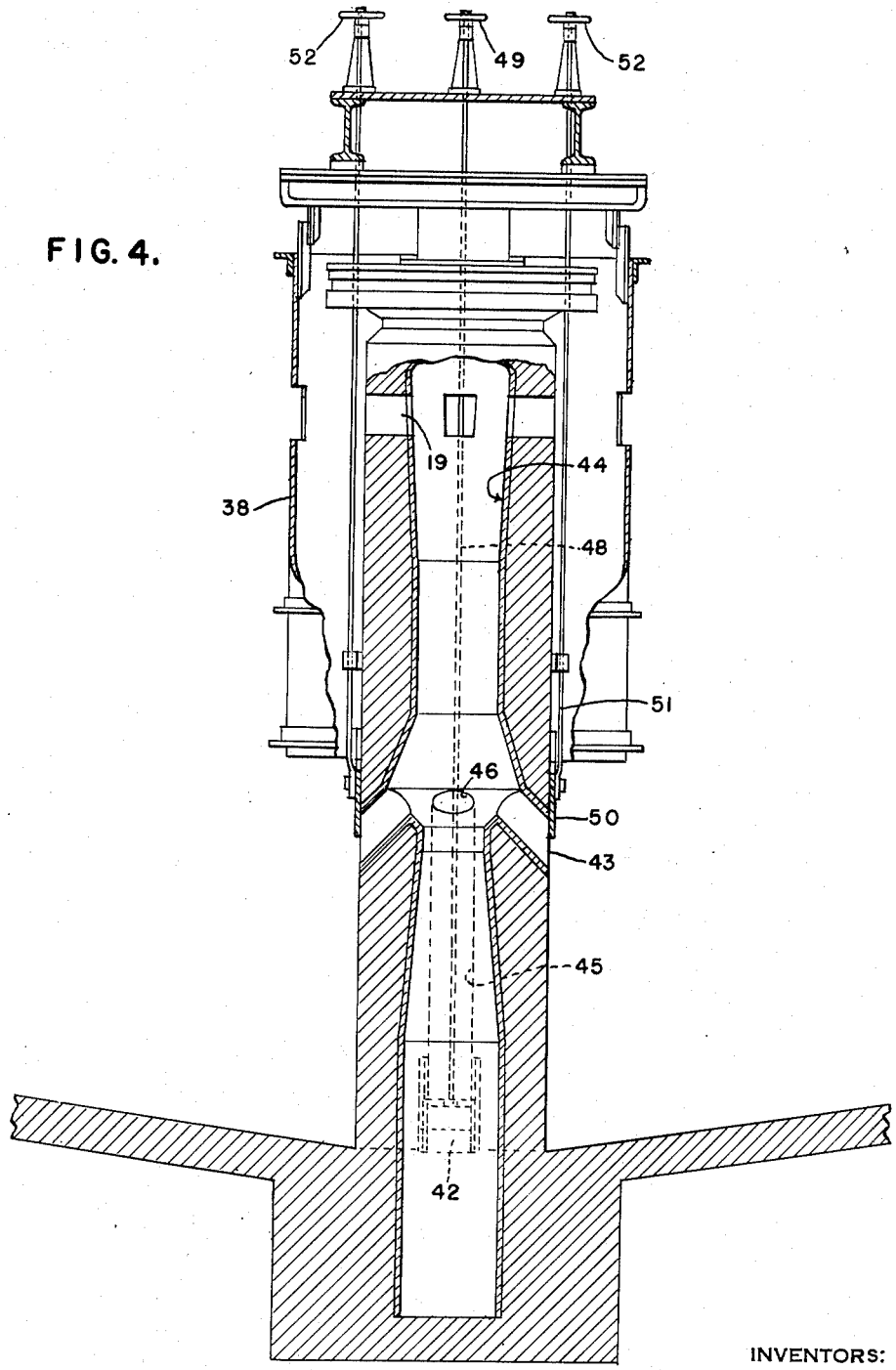

INVENTORS:
WAYNE A. KIVELL &
RENVILLE S. RANKIN,
BY *William J Fox*
ATTORNEY

Patented Feb. 16, 1954

2,669,357

UNITED STATES PATENT OFFICE 2,669,357

CLARIFICATION TREATMENT OF SOLIDS CARRYING LIQUID AND APPARATUS THEREFOR

Wayne A. Kivell, Bronxville, N. Y., and Renville S. Rankin, Stamford, Conn., assignors to The Dorr Company, Stamford, Conn., a corporation of Delaware Application March 19, 1952, Serial No. 277,386

13 Claims. (Cl. 210—55)

This invention relates to the clarification treatment of solids-carrying liquids in settling tanks where a quantity of the settled solids or sludge is to be continuously remixed with the liquid being continuously fed to the tank while sludge is continuously withdrawn from a sump in the tank bottom, such remixing being employed for encouraging and promoting sedimentation. Examples of such liquid treatment with remixing are found in the purification and softening treatment of water, and in the clarification treatment of sewage and waste liquids.

With such fields of application in mind, the invention relates more particularly to settling tanks where the liquid to be treated feeds continuously to the tank, while settled solids from the liquid are continuously conveyed in the form of sludge by a rotary raking structure to a sump or outlet near the center of the tank, and the resulting clarified liquid continuously overflows into a peripheral launder at the top of the tank; the rotary raking structure usually comprises radially extending rake arms each of which carries a set of raking blades angularly so disposed with respect to their path of movement as to progressively convey and advance the settled solids over the tank bottom towards the center thereof. Indeed this invention is specifically concerned with the treatment of large flows of liquids in a type of tank in which the liquid enters the tank centrally through the bottom and through a hollow central column or pier which has at its top an annular bearing structure for rotatably supporting the sediment raking structure. The pier usually expands at the top into an operating platform which carries motorized drive mechanism for the rotary rake structure. A bridge usually leads from the tank wall to the platform. In that type of tank the supply of feed liquid is provided at an adequate hydraulic head, so it passes underneath the tank and then upwardly through the central column to discharge into the tank proper by way of ports provided in the upper end portion of the pier below the bearing structure.

Indeed, for the treatment of such as the above indicated liquids such tanks comprise two sequential treatment stages or concentric treatment zones; namely an agitation zone directly surrounding the pier, and an annular quiescent zone which in turn surrounds the central agitation zone, these two treatment zones being defined by a vertical cylindrical partitioning wall disposed coaxial with the pier, and rising from just above the rake arms of the raking structure to above the liquid level in the tank. Feed liquid entering such a tank centrally from the hollow pier undergoes suitable agitation and flocculation treatment in the central agitation zone while passing downwardly therethrough, then transits outwardly in all directions from under the cylindrical partitioning wall into the surrounding quiescent zone there to deposit sediment on the tank bottom so that clarified liquid may reach and overflow into the peripheral discharge launder.

Where such a bottom-fed, center-pier type, two-zone treatment tank serves the treatment of water as in softening, the central agitating zone may be equipped with rotary flocculating mechanism as of the vertical picket fence type for effecting flocculation of precipitated or coagulated solids in that zone; where such a two-zone treatment unit serves the clarification of sewage liquids, the agitation together with aeration of the liquid is effected by means of air diffusion pipes or air diffusers provided in submergence in that zone and spaced from and around the center pier. These air diffusers effect agitation as well as aeration of the sewage whereby organic matter is supplied oxygen needed for stabilization as to putrescence and for satisfying its biologic oxygen demand.

In the clarification of such as the aforementioned solids-carrying liquids it is desirable that a portion of the settled solids or sludge be continuously retransferred to the feed liquid and be remixed therewith, in order that the effectiveness of treatment in the central agitation zone of that tank may be improved to the end of increasing the settleability of the solids and hence the over-all settling efficiency of the tank unit. Remixing such solids or sludge with the fresh feed encourages and improves flocculation of solids in the agitation zone and hence the settleability of the precipitated and coagulated solids in the purification treatment of water, whereas in the case of clarification treatment of sewage the admixing of the sludge to the feed liquid not only increasingly stabilizes the organic matter but also promotes its flocculation and settleability.

It is among the objects of this invention to provide for such large-size bottom-fed, center-pier type, two-zone treatment tanks improvements in the nature of simple and efficient sludge transfer means whereby settled solids or sludge from the tank bottom are transferred to and mixed with the fresh feed continuously at a desired rate; to provide retransfer and mixing means that can be embodied compactly in the structure of such a tank even though without any radical changes of the above-defined general construction thereof; to provide retransfer and mixing means that add nothing to the excavation requirements of the tank unit nor add to the tank structure nor require any auxiliary boosting devices such as pumps or air lifts for effecting retransfer and mixing; and to provide retransfer and mixing means whereby the transfer of sludge from the tank bottom back to and into the feed liquid and to the agitation zone can be attained directly without requiring extra connections or piping externally of the tank proper, and whereby the transfer is gentle by non-mechanically induced hydraulic flow effects in distinction from the floc-disintegrating-and shearing effects attendant to the operation of motor-driven draft-tube impellers or the like.

These objects are attained by providing sludge ingress ports in the lower end portion of the hollow pier and changing the effective inner contour of the otherwise cylindrical hollow of the pier as heretofore known, to form a Venturi-like or eductor-like constriction above the sludge ingress openings and so related thereto and so dimensioned that the upflow velocity alone of the liquid draws the desired quantity of sludge from the lower strata of the liquid body in the tank into the upflowing stream of feed liquid to mix therewith prior to its issuing from the egress port in the upper end portion of the pier. In this way no other boosting means or devices are required for effecting the retransfer of the sludge solids to the feed liquid, other than a few inches of the hydrostatic head usually available in the feed liquid supplied.

According to one feature there are provided regulating means operable from the platform atop the pier for controlling the opening of the sludge ingress openings and thereby controlling the rate at which sludge solids are retransferred from the bottom of the tank to the interior of the pier by and to the feed liquid rising therethrough.

According to a more specific feature, where the manner of conduit of the sedimentation operation involves maintaining a sludge blanket of significant depth at the bottom of the tank, the retransfer regulating means are such as to be operable not only to vary the quantity of solids to be retransferred, but also operable in a manner whereby the solids to be retransferred can be drawn in effect from a particular desired strata of the strata of the sludge blanket.

In summary, this invention provides simple and inexpensive sludge transfer means for improving the operation and the sedimentation-treatment capacity of bottom-fed, center-pier type, two-zone treatment tanks which have a rotary raking structure operatively supported by the pier with a stationary operating platform atop the pier for mounting the machinery for rotating the rake structure, such transfer means being provided by transforming the hollow pier as heretofore known into a flow-velocity-increasing sludge induction device with inner Venturi-like contours operable by the hydrostatic head of the feed liquid itself, with ingress openings at the foot end of the pier.

In addition, simple gate type retransfer regulating means are provided which can be raised or lowered from the operating platform atop the pier.

Fig. 1 is an elevational section of a bottom-fed, center-pier type, two-zone treatment tank with the center pier portion part-sectional to indicate therein the Venturi-like duct construction, with rotary flocculating mechanism for use in water conditioning.

Fig. 3 is a sectional plan view taken on line 3—3 of Fig. 2.

Fig. 4 is a vertical detail section taken on line 4—4 of the plan view of Fig. 3 showing a high pair of sludge return openings and control gates therefor.

Figure 2:
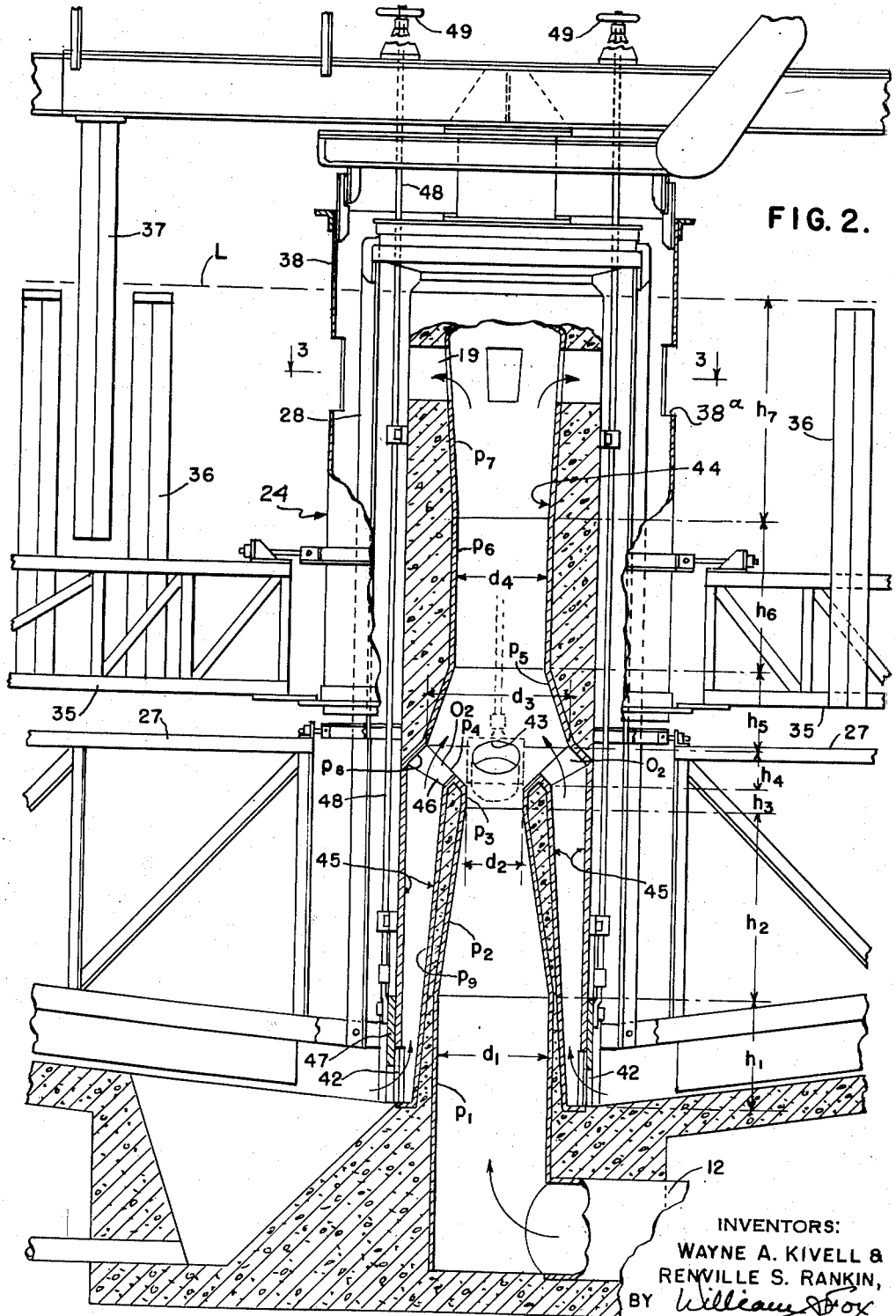
Fig. 2 is an enlarged detail sectional view of the center pier portion of the tank of Fig. 1, showing more clearly the Venturi-construction with a low pair of sludge return openings and control gates therefor.

The embodiment in Fig. 1 of a round center-pier two-zone type of treatment tank 10 comprises a shallow conical bottom 11 provided with a supply conduit 12 for feed liquid leading to the center of the bottom, and with an off-center sludge sump 13 having a sludge withdrawal pipe connection 14. A cylindrical tank wall 15 rising from the circumference of the bottom is provided along its top end with an overflow launder 16 for receiving and discharging clarified liquid from the tank, the liquid level L in the tank being determined by the overflow edge 17 of the launder.

From where the feed liquid enters through the bottom there rises a hollow pier or column 18 through which feed liquid may pass upwardly for discharge from discharge -or egress ports 19 in the upper end portion thereof. Atop this column is mounted an operating platform construction 20. A bridge 21 indicated by I-beams 22 leads to the operating platform and has its one end supported thereby while the other end is shown supported upon the tank wall. Also various motorized drive mechanism is mounted upon and supported by the operating platform, namely a drive unit $M_1$ for revolving a sediment raking structure 23 rotatably supported by the platform 20 and a drive unit $M_2$ for revolving an agitating structure 24 and also rotatably supported by the platform 20.

The agitating structure 24 operates within a central agitation or flocculation zone $Z_1$ directly surrounding the pier although spaced a distance $d$ from the tank bottom, such a zone being defined as against a surrounding outer annular quiescent zone $Z_2$ by a cylindrical baffle wall 25 provided at its bottom with an annular substantially horizontal shelf 26 which in turn defines an opening O for downward passage therethrough of floc-bearing liquid from the agitated flocculation zone $Z_1$ to the quiescent sedimentation zone $Z_2$.

More particularly, the raking structure 23 comprises a customary set of radially extending rake arms 27 which carry sediment engaging raking blades 28 which when the raking structure is rotated convey settled solids from outlying annular zones of the bottom towards the center pier where they collect in sump 13 to be withdrawn as sludge through pipe 14.

The rake arms 27 in turn are mounted upon a rotary cage structure 28 (see Fig. 2 and Fig. 5) herein termed the inner cage structure, the top end of which is supported by a vertical thrust ball bearing B1 constituted by an upper annular bearing member 29 forming the upper end portion of the cage structure 28 and by a lower stationary bearing member 30 shown to form part of the operating platform structure 20, the two bearing members 29 and 30 representing raceways for bearing balls 31. The upper bearing member or race way 29 is furthermore formed with an internally toothed ring gear 32 meshing with a pinion 33 fixed on a vertical shaft 34 rotatable in the platform structure and driven by the drive unit M1.

The rotary agitating structure 24 in Figs. 1 and 2 comprises a set of radially extending arms 35, each of which arms carries a set or row of upright agitating elements 36 having cooperative relationship with stationary sets of complementary vertical depending agitating elements 37 extending rigidly downward from the bridge structure. That is to say, as the agitating structure 24 revolves the upright agitating elements 36 will repetitively move past the stationary agitating elements 37 with the relative disposition and relative spacing of the elements 36 and 37 being such that the elements 36 will move through respective spaces provided between the element 37, thereby effecting a kind of agitation of the liquid that is conducive to produce flocculation of the solids suspended in the liquid. The arms 35 are mounted upon and carried by what is herein termed an outer rotary cage structure 38 with flow passages 38ª which cage structure is rotatably supported upon the platform structure 20 by means of a vertical thrust ball bearing B2 constituted by an upper rotary annular bearing member or race way 39 (see Fig. 5) forming the upper end portion of the cage structure 38, and a lower stationary annular bearing member 40 shown to be fastened to the platform structure as by bolts 41. The upper bearing member 39 is also comprising a worm gear 42 rotatable by the drive unit M2.

According to this invention the hollow center pier or column 18 is interiorly constructed in a special manner whereby the column as a whole presents an interior eductor shaped contour with sludge ingress openings provided in the lower end portion of the column. Thus, the very flow of liquid rising in the center pier column is alone utilized to induce and effect reentry in a smooth and gentle manner of desired quantities of previously flocculated solids into the rising stream of liquid in the column.

More in particular, the ingress openings are shown to comprise a first pair of such openings 42 disposed at the very foot of the column, and a second pair of such openings 43 disposed a distance T above the openings 42. The potential flow through each of these ingress openings is shown to be controlled individually as by a vertically movable gate for each opening from above the platform structure 20. In this way and because of the Venturi effect of the internal eductor shape of the column taken as a whole, there is attainable a controlled and automatic return and introduction of sludge into the stream of feed liquid rising within the column 18 from different levels of a sludge bed which is adapted to be found in the quiescent zone Z2 of the liquid body in the tank. That is to say, due to the Venturi-effect upon the feed liquid rising in the column quantities of relatively concentrated sludge may be drawn at a controllable rate into the column from the bottom strata of the sludge bed through the lower ingress openings 42, or quantities of less concentrated or dilute sludge may be drawn from a higher strata of the sludge bed or blanket through upper ingress openings 43, or else the gate members of respective ingress openings may be so controlled that quantities of concentrated sludge as well as of dilute sludge may be drawn simultaneously into the rising flow of feed liquid by the eductor effect of the column 18.

Figure 5:
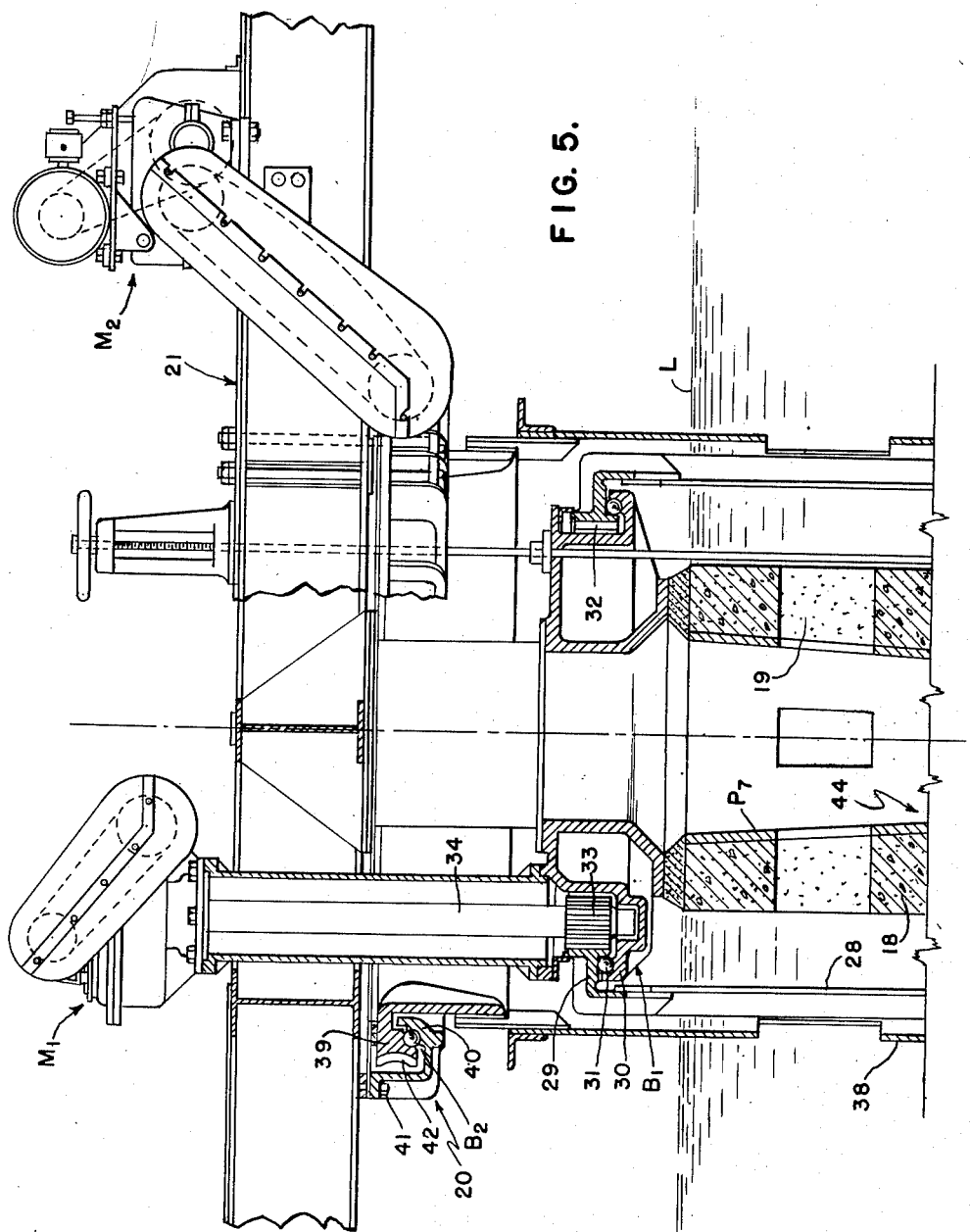
Fig. 5 is a further enlarged sectional detail view of the top end platform-construction of the center pier and of various drive mechanisms mounted thereon.

The construction of the column 18 in accordance with this invention, and especially the interior eductor-shaped contour thereof together with the disposition of the sludge ingress openings and ingress passages, as well as the construction of the central gates for these openings, will now be described more fully by reference to Figures 2, 4 and 5.

The column 18 as a whole is shown to comprise what may be termed an interior shaped steel shell or shaped skeleton structure 44 surrounded by poured concrete so that its exterior may present the appearance of a straight cylindrical column, while the interior as a whole presents the contours of a desired eductor shape capable of handling such volumes of flow as occur in either water—or sewage treatment and yet of operating in accordance with the concept of this invention as regards the manner of returning flocculated solids from the sludge bed to the feed liquid.

In a practical embodiment, the eductor-shaped interior shell or shaped skeleton structure herein simply termed the eductor shape is a combination of cylinder-shaped and cone-shaped component portions of sheet steel, the component portions or sections being joined to one another as by welding to constitute the eductor shape. Starting at the bottom the eductor shape as here shown comprises an initial cylindrical portion $p_1$ of diameter $d_1$ rising to a height $h_1$ above the tank bottom. The next component portion $p_2$ of a height $h_2$ is a steep conical shape with the base diameter $d_1$ narrowing down to a diameter $d_2$ at the top. Then follows a short cylindrical section $p_3$ of a height $h_3$ and a diameter $d_2$. Then follows an inverted relatively shallow conical portion $p_4$ of a height $h_4$ having a pair of openings $O_2$ from each of which extends a downward leg or duct 45 shown to be shaped as to form parts of the exterior contour of the column. Then follows a portion $p_5$ relatively short but of steep conicity and of a height $h_5$, from which rises a straight cylindrical portion $p_6$ of a height $h_6$, topped by an inverted slender conical terminal portion $p_7$ of a height $h_7$.

Each of the two ingress ducts 45 comprises an upper short cylindrical end portion $p_7$ disposed under an angle of about 45° and a lower substantially vertical end portion $p_8$ shaped to join the cylindrical portion of the top along the line 46, and to flatten out at the bottom ingress openings 42.

The ingress openings 42 each have a vertically slidable gate member 47 operable from above the platform 20 by means of rod 48 and handwheel 49 having threading engagement with the rod. In this way the rate of ingress of a denser quality sludge from the bottom strata into the rising column of feed liquid is controlled from zero to full rate by vertical adjustment of the gate members. A similar gate member 50 with rod 51 and handwheel 52 is provided individually for each of the upper ingress openings 43, so that the rate of ingress therethrough of dilute sludge from the upper strata of the sludge bed is thereby controllable from zero to full rate.

The operation of the tank unit employable for the purpose of water purification is shown in the embodiment of Figures 1 to 5 as follows:

The feed liquid entering the tank through feed conduit 12, is water which has been dosed with a precipitating agent and which carries a suspension of flocculatable solids to be removed from the liquid by sedimentation. The feed liquid enters the foot end of the hollow center pier at a velocity determined by the liquid pressure head available and by the entrance diameter $d_1$. As the liquid passes upwardly through the column a portion of pressure head or pressure energy converts into velocity energy due to the conical narrowing of the flow cross-section to the minimum diameter $d_2$. Because of a correspondingly lowered pressure in the zone of highest flow velocity, Venturi-effect sludge from the sludge bed in the zone $Z_2$ is drawn through the lower ingress openings 42 or through the upper ingress openings 43 to mingle gently with the upflowing stream of solids carrying feed liquid, or else through both the upper as well as the lower gate members. That is to say, sludge of relatively high density may be drawn at a desired rate through the lower ingress openings 42 at a desired rate as controlled by the setting of the respective gate members 47, while the upper ingress openings 43 may remain closed; or a relatively dilute sludge may be drawn at a desired rate through the upper ingress openings 43, while the lower ingress openings 42 may remain closed; or else both controlled quantities of relatively concentrated sludge and controlled quantities of dilute sludge are drawn into the rising stream of feed liquid through the respective lower and upper ingress openings with a corresponding setting of the respective gate members 47 and 50 having been effected from above the operating platform structure 20.

Feed liquid thus mingled within the center pier with previously settled flocculated sludge solids of a desired controlled quality and quantity rises through the upper gently widening portion $p_7$ of the hollow interior of the center pier, to issue in radial outward directions from the top of the pier by way of the openings 19.

The feed liquid thus pre-conditioned by the admixture of the sludge solids enters the flocculating zone $Z_1$ through the openings in cage structure 28 and 38. The flocculating zone $Z_1$ contains a liquid body being subjected to agitation by the movements of the agitating members or paddles 36 and 37 relative to one another, the agitation being such as to encourage flocculation in the mixture of suspended fresh and previously flocculated and settled solids. The liquid thus under flocculation slowly descends in the zone $Z_1$ and eventually passes through the transfer opening O into the underlying body of liquid of the quiescent settling zone $Z_2$ where the flocculated solids may settle to form the aforementioned sludge bed or blanket from which a portion is steadily withdrawn through discharge pipe 14 while another portion is steadily and automatically retrieved through the ingress openings into the rising stream of feed liquid for continuous conditioning thereof, and while clarified liquid steadily passes across the overflow edge 17 to discharge into the launder 16.

Figure 6:
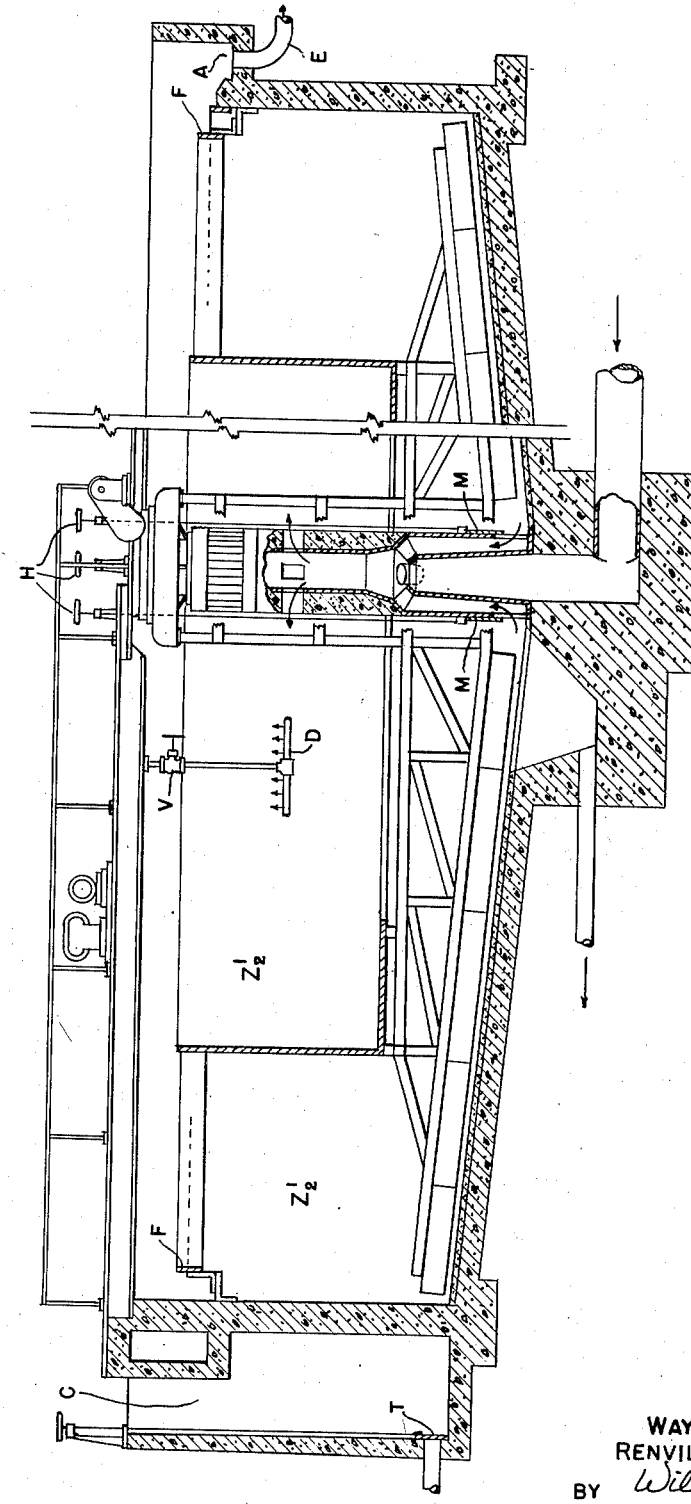
Fig. 6 is an elevational sectional view similar to Fig. 1 although of a tank having stationary air induction pipes in a central agitation aerating treatment zone suited for sewage treatment instead of the mechanical agitating and flocculating mechanism of Fig. 1.

The tank unit employable for the purpose of sewage clarification as shown in Fig. 6 differs structurally from the Fig. 1 embodiment substantially only in that the central agitation zone $Z_1'$ lacks mechanical agitation means, but is provided with aerating devices, that is with a number of submerged air-emitting distributing pipes indicated at D and shown to have a controlled valve V. The suspended sewage matter is thus agitatingly aerated whereby organic matter is supplied oxygen needed for stabilization as to putrescence and for satisfying its biologic oxygen demand, and the matter is also coagulated and eventually fluocculated. Such aerated stablized and flocculated matter descends to the tank bottom where it is raked towards the center of the tank by rotary raking mechanism which is similar to that of Fig. 1 for discharge through a sump from the tank bottom in the manner of the Fig. 1 embodiment. Also, as in Fig. 1, treated matter or sediment or sludge is drawn into and admixed to the stream of incoming raw sewage that rises in the hollow central pier, such admixture being due to the inductor effect of the interior configuration of the central pier which is similar to that of Fig. 1, the quantity or rate of admixture of such portion of sludge being controllable by gate members M which can be manipulated from above as by respective handwheels H and in a manner already described for the Fig. 1 embodiment.

The admixture in this manner of sludge to the incoming raw sewage liquid promotes and improves not only the biological stabilization of the organic sewage matter, but also its flocculation and settling characteristics. Clarified sewage liquid from the outer annular and quiescent zone $Z_2'$ passes under a scum baffle F so as to overflow into a launder A whence it discharges as indicated by a discharge connection E. The scum intercepting baffle F may be associated with a customary scum collecting device (not shown) whereby intercepted scum is moved along the scum baffle to be discharged through a customary discharge device or discharge trough (not shown) into a scum collecting chamber C whence the collected scum may be released as through a manually operable gate T.

We claim:

1. A clarification tank having a hollow center pier structure rising from the bottom and having a bottom feed inlet leading into said hollow pier and also having discharge ports at the upper end, a feed conduit extending underneath the tank to pass feed liquid under hydrostatic operating head to said bottom inlet into and through said hollow pier for discharge through said discharge ports into the tank, a rotary sediment raking structure surrounding the pier and operatively supported by annular bearing means at the top end of the pier and rotatable for conveying sediment inwardly over the tank bottom to a zone of collection and discharge at said pier, a stationary structure at the top of the pier and deriving support therefrom, power drive means provided upon the stationary structure for rotating the raking structure, sediment outlet means for removing collected sediment as sludge from said collection zone, overflow discharge means for clarified liquid at the top of the tank, a cylindrical partitioning baffle wall surrounding the pier and defining an inner agitation zone directly surrounding the pier and an outer quiescent zone surrounding the partitioning wall, said partitioning wall extending from above the liquid level to a level spaced from the tank bottom sufficiently to allow for the passage of sludge to said sludge collection zone and of liquid to said overflow discharge means; characterized in that the pier is provided with sludge inlet ports and that the inner contour of the pier is rendered in the shape of an eductor providing a constriction intermediate the ends of the pier and connected with said inlet ports whereby said pier structure is rendered as a sludge transfer means with the upflow velocity of feed liquid under said hydrostatic pressure being effective to draw a desired volume from said sludge collecting zone through said inlet ports to mingle with the feed liquid for delivery through said discharge ports, said pier having an eductor-shaped hollow core and a jacket of concrete poured around and closing said hollow core so as to follow the contours therefor and constituting columnar support for said stationary structure, said hollow core comprising an intermediate eductor portion provided with eductor inlet openings having respective outwardly extending eductor inlet conduit portions to constitute said inlet ports extending outwardly through said concrete jacket, so that said intermediate eductor portion constitutes a mixing zone for said sludge and said feed liquid, said intermediate eductor portion being wider in the middle than at its upper and lower ends although wider at its upper end than at its lower end and gradually increasing in diameter from the upper and the lower ends towards each other, an upwardly gradually constricted influent eductor portion leading upwardly to the lower end of said intermediate portion, and an upwardly gradually widening effluent eductor portion leading upwardly from the upper end of said intermediate eductor portion.

2. A clarification tank according to claim 1, with the addition of controllable closure means for said sludge inlet ports, and actuating means operable from said stationary structure to set the closure means for a desired degree of closing and for a desired volume rate of sludge transfer.

3. A clarification tank according to claim 1, with the addition of controllable closure means for said sludge inlet ports, and actuating means operable from said stationary structure to set the closure means for a desired degree of closing and for a desired volume rate of sludge transfer, comprising a vertically slidable gate for each of said sludge inlet ports, and positive actuating means extending upwardly from each gate to said platform, and manually operable means for each rod for actuating the gate.

4. A clarification tank according to claim 1, in which the intermediate eductor portion comprises an inverted relatively short frusto-conical shell portion constituting a relatively shallow upwardly flaring continuation of said upwardly constricted eductor portion, and an upwardly constricted frusto-conical shell portion connecting downwardly with the upper end of said flaring portion and upwardly with the lower end of said upwardly widening eductor effluent portion, with said eductor inlet ports extending at a downward angle from said inverted frusto-conical shell portion.

5. A clarification tank according to claim 1 in which said upwardly constricted eductor portion comprises a lower conical portion and an upper straight tubular end portion.

6. A clarification tank according to claim 1 in which said upwardly widening eductor effluent portion comprises a lower straight tubular portion and an upper conical portion.

7. A clarification tank according to claim 1, in which the pier structure is characterized thereby that the eductor inlet conduit portions comprise one pair of relatively short conduits arranged oppositely to one another and at a downward angle to terminate an appreciable distance above the tank bottom, and a pair of longer conduits arranged oppositely to one another and extending downwardly to terminate substantially closer to the tank bottom than the first mentioned pair, and closure means operable from said platform for selectively controlling the through flow area of the short conduits and the longer conduits relative to one another.

8. A clarification tank according to claim 1, in which the pier structure is characterized thereby that the eductor inlet conduit portions comprise one pair of conduits arranged oppositely to one another and extending downwardly an appreciable distance and along said gradually constricted eductor influent portion to terminate at the tank bottom.

9. A clarification tank having a hollow center pier structure rising from the bottom and having a bottom feed inlet leading into said hollow pier and also having discharge ports at the upper end, a feed conduit extending underneath the tank to pass feed liquid under hydrostatic operating head to said bottom inlet into and through said hollow pier for discharge through said ports into the tank, a rotary sediment raking structure surrounding the pier and operatively supported by annular bearing means at the top end of the pier and rotatable for conveying sediment inwardly over the tank bottom to a zone of collection and discharge at said pier, a stationary structure at the top of the pier and deriving support therefrom, power drive means provided upon the stationary structure for rotating the raking structure, sediment outlet means for removing collected sedigment as sludge from said collection zone, overflow discharge means defining the overflow level for clarified liquid at the top of the tank, a cylindrical partitioning baffle wall surrounding the pier and defining an inner agitation zone directly surrounding the pier and an outer quiescent zone surrounding the partitioning wall, said partitioning wall extending from above the liquid level to a level spaced from the tank bottom sufficiently to allow for the passage of sludge to said sludge collection zone and of liquid to said overflow discharge means; characterized thereby that the pier provides columnar structure of poured concrete to furnish support for said stationary structure, and that the inner contour of the pier is rendered in the shape of an eductor providing a constriction intermediate the upper and lower end of the pier and sludge inlet ports connected with said constriction whereby said pier structure is renderd as a sludge transfer means with the upflow velocity of feed liquid under said hydrostatic pressure being effective to draw a desired volume from said sludge collecting zone through said inlet ports to mingle with the feed liquid for delivery through said discharge ports, said inner contour comprising a mixing zone for said sludge and said feed liquid, which is wider in the middle than at its upper and lower ends although wider at the upper end than at the lower end and gradually increasing in diameter from the upper and the lower ends towards each other, with said sludge inlet ports extending in said concrete from said mixing zone substantially between the widest cross-section and the lower end cross-section thereof, and further comprising an upwardly gradually constricted eductor influent portion leading upwardly to said intermediate portion, and an upwardly gradually widening eductor effluent zone leading upwardly from said intermediate zone.

10. A clarification tank having a hollow center pier structure rising from the bottom and having a bottom feed inlet leading into said hollow pier and also having discharge ports at the upper end, a feed conduit extending underneath the tank to pass feed liquid under hydrostatic operating head to said bottom inlet into and through said hollow pier for discharge through said ports into the tank, a rotary sediment raking structure surrounding the pier and operatively supported by annular bearing means at the top end of the pier and rotatable for conveying sediment inwardly over the tank bottom to a zone of collection and discharge at said pier, a stationary structure atop the pier, power drive means provided upon stationary structure for rotating the raking structure, sediment outlet means for removing collected sediment as sludge from said collection zone, overflow discharge means defining the overflow level for clarified liquid at the top of the tank, a cylindrical partitioning baffle wall surrounding the pier and defining an inner agitation zone directly surrounding the pier and an outer quiescent zone surrounding the partitioning wall, said partitioning wall extending from above the liquid level to a level spaced from the tank bottom sufficiently to allow for the passage of sludge to said sludge collection zone and of liquid to said overflow discharge means, characterized in that the pier is provided with sludge inlet ports and that the inner contour of the pier is rendered in the shape of an eductor providing a constriction intermediate the ends of the pier and connected with said inlet ports whereby said pier structure is rendered as a sludge transfer means with the upflow velocity of feed liquid under said hydrostatic head being effective to draw a desired volume from said sludge collecting zone through said inlet ports to mingle with the feed liquid for delivery through said discharge ports, said pier having a hollow columnar steel structure comprising an intermediate eductor portion provided with eductor inlet openings and constituting a mixing zone for said sludge and said feed liquid, said intermediate eductor portion being wider in the middle than at its upper and lower ends although wider at its upper end than at its lower end and gradually increasing in diameter from the upper and the lower ends towards each other, with said eductor inlet openings provided substantially between the widest cross-section and the lower end cross-section thereof, an upwardly gradually constricted influent eductor portion leading upwardly to the lower end of said intermediate portions, and an upwardly gradually widening effluent eductor portion leading upwardly from the upper end of said intermediate eductor portion.

11. A clarification tank according to claim 10, in which the intermediate eductor portion comprises an inverted relatively short frusto-conical shell portion as an upwardly flaring continuation of said upwardly constricted eductor portion, and an upwardly constricted frusto-conical shell portion connecting downwardly with the upper end of said flaring portion and upwardly with the lower end of said upwardly widening eductor effluent portion, with said eductor inlet ports extending at a downward angle from said inverted frusto-conical shell portion.

12. A clarification tank according to claim 10 in which said upwardly constricted eductor portion comprises a lower conical portion and an upper straight tubular end portion.

13. A clarification tank according to claim 10 in which said upwardly widening inductor effluent portion comprises a lower straight tubular portion and an upper conical portion.

WAYNE A. KIVELL.
RENVILLE S. RANKIN.

References Cited in the file of this patent
UNITED STATES PATENTS

| Number | Name | Date |
| --- | --- | --- |
| 1,123,011 | Ripley | Dec. 29, 1914 |
| 2,268,475 | Darby | Dec. 30, 1941 |
| 2,268,726 | Tark | Jan. 6, 1942 |
| 2,274,361 | Darby | Feb. 24, 1942 |
| 2,353,358 | Prager | July 11, 1944 |
| 2,404,701 | Felsecker | July 23, 1946 |
| 2,427,886 | Walker | Sept. 23, 1947 |
| 2,506,927 | Kelly | May 9, 1950 |